(12) United States Patent
Lindsay et al.

(10) Patent No.: US 12,529,629 B2
(45) Date of Patent: Jan. 20, 2026

(54) SAMPLE PREPARATION METHOD AND APPARATUS

(71) Applicant: Oxford Instruments Nanotechnology Tools Limited, Abingdon (GB)

(72) Inventors: John Lindsay, Abingdon (GB); Patrick Trimby, Abingdon (GB); Peter Statham, Abingdon (GB); Niels-Henrik Schmidt, Paderborn (DE); Knud Thomsen, Paderborn (DE)

(73) Assignee: OXFORD INSTRUMENTS NANOTECHNOLOGY TOOLS LIMITED, Oxon (GB)

( * ) Notice: Subject to any disclaimer, the term of this patent is extended or adjusted under 35 U.S.C. 154(b) by 392 days.

(21) Appl. No.: 18/023,692

(22) PCT Filed: Aug. 26, 2021

(86) PCT No.: PCT/GB2021/052221
§ 371 (c)(1),
(2) Date: Feb. 27, 2023

(87) PCT Pub. No.: WO2022/043694
PCT Pub. Date: Mar. 3, 2022

(65) Prior Publication Data
US 2023/0273136 A1     Aug. 31, 2023

(30) Foreign Application Priority Data

Aug. 28, 2020 (GB) ..................... 2013591

(51) Int. Cl.
*G01N 1/28* (2006.01)
(52) U.S. Cl.
CPC ..................... *G01N 1/28* (2013.01)
(58) Field of Classification Search
USPC ................................. 250/306, 307
See application file for complete search history.

(56) References Cited

U.S. PATENT DOCUMENTS 6,080,991 A    6/2000  Tsai
6,194,720 B1   2/2001  Li et al.
(Continued)

FOREIGN PATENT DOCUMENTS

CN    105588742 A    5/2015
JP    2000310585 A   11/2000
(Continued)

OTHER PUBLICATIONS

Nolze, Gert et al., Crystallometric and projective properties of Kikuchi diffraction patterns, Journal of Applied Crystallography, ISSN 0021-8898, © 2016 International Union of Crystallography.
(Continued)

*Primary Examiner* — Kiet T Nguyen
(74) *Attorney, Agent, or Firm* — Blank Rome LLP

(57) ABSTRACT

The invention relates to a method of preparing a sample for analysis. The method comprises: providing a sample comprising a surface region of interest on a first face of the sample and a second face oriented at an angle to the first face about a common edge between the first and second faces, the second face extending between the common edge and a second edge on the opposing side of the second face of the sample; and milling the second face of the sample to provide a trench in the surface of the second face, the trench extending from a first position on the second face between the common edge and the second edge to a second position adjacent to the common edge; wherein the trench is arranged so as to provide an electron transparent sample layer comprising the surface region of interest. By milling the second face of the sample only, a surface region of interest on the first face of the sample is fully preserved and remains free of milling beam induced damage. This allows for correlative characterisation work which requires both an electron trans-
(Continued)

parent sample and a fully intact sample surface to obtain surface-sensitive data.

22 Claims, 9 Drawing Sheets

(56) References Cited

U.S. PATENT DOCUMENTS

| | | | |
|---|---|---|---|
| 8,723,144 | B2 | 5/2014 | Kidron et al. |
| 2013/0174301 | A1* | 7/2013 | Robinson ............... G02B 21/26 |
| | | | 250/307 |
| 2015/0330877 | A1 | 11/2015 | Schmidt et al. |
| 2022/0157560 | A1* | 5/2022 | Willard .................. H01J 37/31 |
| 2024/0120175 | A1* | 4/2024 | Lechner .............. H01J 37/3056 |

FOREIGN PATENT DOCUMENTS

| | | | |
|---|---|---|---|
| JP | 2015109263 | A | 6/2015 |
| JP | 2016105077 | A | 6/2016 |
| WO | 2015121603 | A1 | 8/2015 |
| WO | 2015170397 | A1 | 11/2015 |

OTHER PUBLICATIONS

Japanese Office Action received in corresponding patent application No. 2023-512960, dated Jul. 7, 2025.

\* cited by examiner

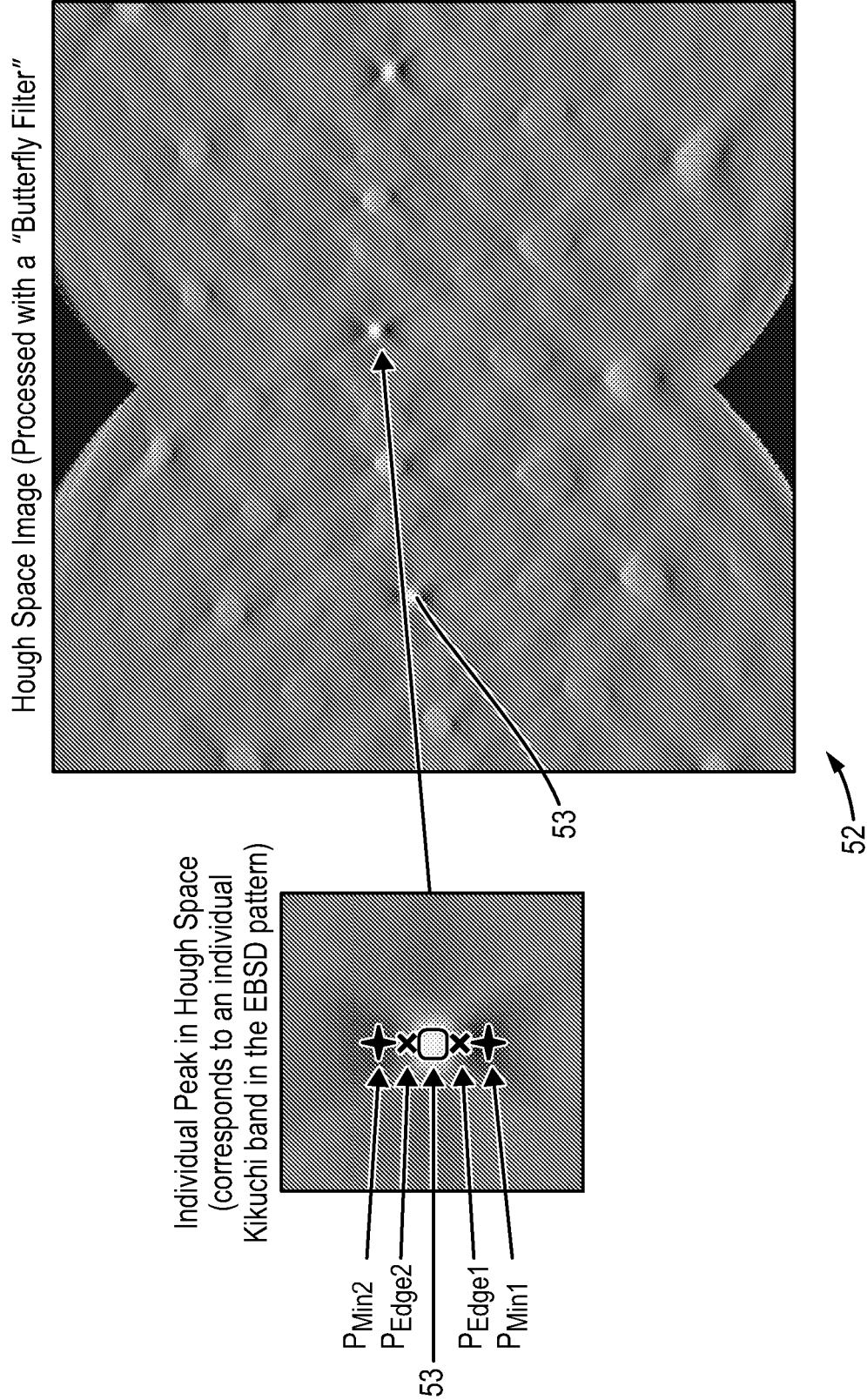

Tilt: 0 deg
SE / BSE imaging / CL / EDS

Tilt: 70 deg
Conventional EBSD

Tilt: 140-150 deg
FIB milling of sample side

Tilt: 150-160 deg
TKD analysis of thinned region

Tilt: 0 deg
High resolution EDS

SAMPLE PREPARATION METHOD AND APPARATUS

CROSS-REFERENCE TO RELATED APPLICATIONS

This application is a national stage application of PCT/GB2021/052221, filed on Aug. 26, 2021, which claims priority to GB Patent Application Serial No. 2013591.9, filed Aug. 28, 2020, both of which are hereby incorporated herein by reference in their entirety.

The present invention relates to a method and apparatus for preparing a sample for analysis, in particular a method and apparatus using a milling beam system to prepare a sample for further characterisation.

BACKGROUND

There are many material and device characterisation techniques that require a suitable sample to be prepared to enable the subsequent analysis. Such characterisation techniques include electron microscopy based analysis such as transmission and scanning electron microscopy (TEM/SEM), electron diffraction techniques such as selected area diffraction (SAED) and electron backscatter diffraction (EBSD), spectroscopy techniques such as electron energy loss spectroscopy (EELS) and energy dispersive X-ray spectroscopy (EDS) and surface analysis techniques such as atomic force microscopy (AFM), among many others.

Such characterisation techniques often place requirements on the sample that must be met during sample preparation to ensure high quality data can be gathered. If multiple characterisation techniques are to be used for correlative analysis it must be ensured that these requirements are consistent, as preparing a sample to be characterised by one method may preclude characterisation by a further method, for example preparing an electron transparent sample may well prevent subsequent surface characterisation.

One such example of challenging sample preparation for correlative analysis is the characterisation of polycrystalline thin films where crystallographic structural information of the thin film is required alongside surface sensitive data such as topography. Generally such samples must be analysed in the TEM to obtain structural information at a resolution of less than 100 nm. This requires the preparation of electron transparent samples, which are then transferred to the TEM for characterisation, using techniques such as selected area diffraction and diffraction contrast imaging to obtain nanoscale crystallographic information.

The preparation of site-specific electron transparent samples is generally carried out using a FIB-SEM to mill trenches around a region of interest and lift-out a sample to be thinned and then transferred to the TEM. There are a number of issues with these known sample preparation techniques. Firstly, these techniques often result in ion beam induced damage to the sample which inhibits subsequent correlative characterisation work. Furthermore, lift-out techniques are time consuming, require transfer between instruments and have a significant failure rate. Moreover, no simple FIB lift-out technique allows for preparation of a plan view sample in which the surface region is preserved to allow subsequent characterisation. Therefore these methods cannot be used to provide a complete characterisation of many samples, such as polycrystalline thin films Accordingly there exists a need for a method of sample preparation which facilitates correlative characterisation work and makes progress in overcoming some of the above problems. In particular there is a need for a method of sample preparation which preserves the sample surface and allows for correlative characterisation work of polycrystalline thin films.

SUMMARY OF INVENTION

In a first aspect of the invention there is provided a method of preparing a sample for analysis, the method comprising: providing a sample comprising a surface region of interest on a first face of the sample and a second face oriented at an angle to the first face about a common edge between the first and second faces, the second face extending between the common edge and a second edge on the opposing side of the second face of the sample; milling the second face of the sample to provide a trench in the surface of the second face, the trench extending from a first position on the second face between the common edge and the second edge to a second position adjacent to the common edge; wherein the trench is arranged so as to provide an electron transparent sample layer comprising the surface region of interest.

By milling the second face of the sample only, a surface region of interest on the first face of the sample is fully preserved and remains free of milling beam induced damage. This allows for correlative characterisation work which requires both an electron transparent sample and a fully intact sample surface to obtain surface-sensitive data.

A further major advantage of the method according to the present invention is that it allows for structural characterisation of the sample at a resolution of <10 nm in-situ within the milling beam instrument, such as a FIB-SEM. In particular, transmission Kikuchi diffraction (TKD) can be carried out on a sample prepared with this method, within the FIB-SEM, to provide crystallographic information at a resolution which is generally only possible in a TEM. Since the sample surface region of interest remains fully intact, and given TKD is sensitive only to the crystallinity of the exit surface, the electron beam can be focussed on the milled underside of the electron transparent sample layer and the transmitted scattered electrons collected, for example using EBSD hardware and software. The method according to the present invention therefore allows sample preparation and nanoscale characterisation to take place within the same instrument, removing the need to transfer the sample between instruments.

The sample preparation method uses the surrounding bulk sample to support the electron transparent sample layer and does not require the subsequent lift-out and attachment to a TEM grid required in conventional FIB lift-out methods. The sample preparation method allows for preparation of a suitable electron transparent sample in a much shorter timeframe, even discounting the additional time required to transfer the sample to a TEM in the conventional methods.

The trench is positioned wholly within the second face of the sample, i.e. the trench extends from a position on the second face of the sample towards the common edge. In particular the second face of the sample extends away from the common edge to a second edge on the opposing side of the second face and the trench extends from a position between the common edge and second edge towards the common edge. By positioning the trench such that it is positioned wholly within the second face of the sample in this way, it is not necessary to mill through the full thickness of the sample (i.e. from the second edge up to a position adjacent to the sample region of interest). This significantly reduces the amount of milling required, minimising the preparation time required and limiting the risk of damage to the sample region of interest, while still allowing for characterisation of the surface region of interest by tilting of the sample to direct the imaging and characterising beams at an angle to access the underside of the surface region of interest through the trench.

Furthermore, since part of the sample remains intact near the second edge of the second face, the milled sample remains more stable. It also means the sample preparation technique can be applied to bulk samples, where milling through the full thickness of the sample to the underside of the surface region of interest would not be feasible.

Preferably the trench is an angled trench which extends downwards from the position on the second face (between the common edge and second edge) towards the common edge. As described above, this allows for subsequent characterisation of a sample of any thickness and significantly reduces the amount of milling required relative to known techniques in which the entirety of the thickness of the sample must be removed to leave an electron transparent region.

In some examples of the method, the sample may not have a well-defined single "common edge" between a first face and second face. The "second face" of the sample is intended to encompass a portion of the sample allowing milling of the sample to approach a surface region of interest on a first face from the below the surface region of interest, leaving the surface region of interest unexposed to the milling beam. In particular, the method may comprise providing a sample comprising a surface region of interest; and milling the sample to provide a trench in the surface of the sample such that the trench approaches the underside of the surface region of interest, thereby providing an electron transparent sample layer comprising the surface region of interest. In particular the method may comprise orienting the sample relative to a milling beam system such that the milling beam is parallel with the surface layer of interest and milling towards the underside of the surface region of interest.

Preferably the trench in the second face is arranged such that the electron transparent sample layer is parallel to the first face of the sample. The surface region of interest may be on an approximately planar portion of the first face and the trench is arranged such that the electron transparent sample region comprises the planar portion of the first face.

Preferably milling the second face of the sample is carried out with a milling beam system and the method further comprises orienting the sample such that the milling beam is parallel with the surface layer of interest. This allows for providing a substantially uniform thickness of the electron transparent sample layer and allows for providing a planar electron transparent sample layer which is parallel with the first face.

Preferably the trench in the second surface comprises a sloping trench with a deepest side adjacent to the common edge between the first and second faces. This allows for the minimum amount of material to be milled whilst still providing an electron transparent surface layer. The sloping trench may comprise a first internal side parallel with the surface layer of interest, the base of the first internal side defining the deepest point of the trench; and an angled bottom surface sloping upwards away from the base of the first internal side to meet the surface of the second face.

By milling a sloping trench with a deepest side adjacent to the common edge, there is no limit to the thickness of the sample and the method may also be applied to bulk specimen. Certain prior art techniques require milling through the sample from the opposing side of the sample (milling up to the surface region of interest from a side opposite to that first face of the sample). This places a restriction on the thickness of the sample that can be used (generally to a maximum of around 50 μm) as the entire thickness of the specimen must be milled away to leave the electron transparent region. In contrast, by using a sloping trench in the surface of the second face, a sample of any thickness can be used and the amount of milling required is significantly reduced, whilst still allowing the surface region to be analysed by orienting the sample to direct the electron beam at an angle relative to the second face of the sample. In particular, the electron beam may be oriented at the same or similar angle relative to the first face as the angle of the sloping surface of the trench.

The angled bottom surface may be oriented at an angle of between 30-85 degrees relative to the first face of the sample, preferably 65-70 degrees. This provides the most effective balance between reducing the amount of milling required whilst allowing the electron beam to be oriented at near perpendicular to the electron transparent sample region.

The milling is preferably performed using one or more of: a focussed ion beam; a broad ion beam; and a laser.

Preferably milling the second face of the sample comprises: performing a coarse milling step to provide the sample layer with a first thickness; and subsequently performing a fine milling step to reduce the thickness of the sample layer to a second thickness, less than the first thickness. In particular, the coarse milling step may be carried out at a first beam current or power and the fine milling step may be carried out at a second, lower beam current or power. In this way, the majority of material may be milled away quickly using the coarse milling step, with the fine milling step then optimised to reduce damage of the electron transparent sample layer.

The method may further comprise: directing a focussed electron beam through the electron transparent sample layer; collecting a signal generated by the interaction of the focussed electron beam with the electron transparent sample layer with a detector. The signal may comprise one or more of scattered electrons, transmitted electrons, x-rays.

In certain examples the step of collecting a signal comprises: collecting scattered electrons from the electron transparent sample layer with an electron detector. The method may comprise directing the focussed electron beam at an angle of 65-75 degrees to the plane of the electron transparent sample layer. The method may comprise collecting scattered electrons with an electron imaging detector, for example an EBSD detector. The method may comprise collecting transmission Kikuchi diffraction (TKD) data. The method may comprise analysing the collected electron image to identify one or more Kikuchi bands. The method may comprise determining the crystallographic orientation of a portion of the sample on which the focussed electron beam is positioned using the identified one or more Kikuchi bands Preferably the method comprises orienting the sample to: direct the focussed electron beam at the milled surface of the electron transparent sample layer; and direct the electron detector at the first face of the sample, opposite to the milled surface. Because, transmission Kikuchi diffraction is sensitive only to the crystallinity of the exit surface and the surface region of interest is preserved, high quality data can be obtained even if the quality of the milled surface is low.

In some examples of the invention collecting a signal comprises: collecting X-rays generated in the electron transparent sample layer with an X-ray detector. The method may comprise orienting the sample to: direct the focussed electron beam at the surface region of interest on the first face of the sample: direct the X-ray detector at the surface region of interest on the first face of the sample. In this way X-ray spectroscopy can be performed on the surface region of interest.

In some examples of the invention the second face of the sample is oriented at an angle to the first face, for example perpendicular to the first face. The first face of the sample may comprise a polycrystalline surface layer, for example wherein the polycrystalline surface layer comprises a thickness of less than 100 nm and/or comprises nanocrystalline structures with dimensions less than 100 nm. The method is particularly well suited to such samples as it allows for collecting crystallographic information from the thin film which is not possible using conventional methods.

In some examples the method may comprise depositing a protective layer on the second face of the sample using electron beam deposition prior to the milling step. In particular the protective layer may extend over an area of the second face of the sample adjacent to the common edge and preferably over the common edge to protect the sample during the milling steps. The protective layer may comprise platinum.

The method may further comprise preparing the first face of the sample prior to milling to produce a deformation free surface. In this way, standard EBSD analysis may be performed on the surface prior to the milling steps with higher resolution TKD analysis performed after the milling steps.

In some examples of the invention, the method may comprise milling the first face of the sample to prepare a polished surface on the surface region of interest prior to milling the trench in the second face of the sample. In this way, a uniform thickness of the electron transparent sample layer may be provided. The milling beam angle used for milling of the first face may be used for polishing the underside of the electron transparent sample layer within the trench to further ensure uniform thickness. In these examples preferably the method comprises depositing a protective layer on the first and/or second face of the sample prior to milling the first face of the sample.

Preferably the method further comprises analysing the surface region of interest on the first face of the sample using a characterisation technique. The characterisation technique may include one or more of atomic force microscopy, EBSD, SEM imaging, EDS, cathodoluminescence spectroscopy. Because the current method leaves the first face intact, these types of surface characterisation techniques may be applied to the first face of the sample, before or after milling.

In a further aspect of the invention there is provided an apparatus for preparing a sample for analysis, the sample comprising a surface region of interest on a first face of the sample and a second face oriented at an angle to the first face about a common edge between the first and second faces, the second face extending between the common edge and a second edge on the opposing side of the second face of the sample, the apparatus comprising: a milling beam system arranged to mill the second face of the sample to provide a trench in the surface of the second face, the trench extending from a first position on the second face between the common edge and the second edge to a second position adjacent to the common edge; wherein the trench is arranged so as to provide an electron transparent sample layer comprising the surface region of interest; an electron beam system arranged to direct a focussed electron beam through the electron transparent sample layer; and a detector arranged to collect a signal generated by the interaction of the focussed electron beam with the electron transparent sample layer.

The apparatus therefore allows for structural characterisation of the sample at a resolution of <10 nm, where both preparation and characterisation of the sample take place within the apparatus. In particular, sample preparation and subsequent transmission Kikuchi diffraction (TKD) can be carried out using the apparatus, to provide crystallographic information at a resolution which is generally only possible in a TEM. Since the sample surface region of interest remains fully intact, and given TKD is sensitive only to the crystallinity of the exit surface, the electron beam can be focussed on the milled underside of the electron transparent sample layer and the transmitted scattered electrons collected, for example using EBSD hardware and software.

The apparatus preferably comprises an electron detector configured to collect scattered electrons from the electron transparent sample layer to provide an electron intensity image. The apparatus is preferably configured to allow orientation of the sample such that: the focussed electron beam is directed at the milled surface of the electron transparent surface layer; and the electron detector is directed at the first face of the sample, opposite to the milled surface.

The apparatus preferably further comprises a processing unit configured to analyse the electron intensity image to identify one or more Kikuchi bands within the signal. In particular the processing unit may be configured to execute a computer implemented method for analysing a collected signal to identify one or more Kikuchi bands and preferably determine a crystallographic orientation of the sample or a part of the sample. The processing unit may be further configured to determine the distance of a Kikuchi band from the pattern centre; and mitigate the effect of gnomonic distortion on the shape of the Kikuchi band based on the determined distance. The processing unit may be more specifically configured to calculate a range comprising a maximum and minimum projected bandwidth for a Kikuchi band for a candidate material; and reject an identified Kikuchi band if the measured bandwidth is outside of the calculated range for the candidate material. The processing unit may be configured to calculate a range comprising a maximum and minimum projected bandwidth for a Kikuchi band based on a plurality of candidate phases stored in a memory, wherein the candidate phases may be selected by a user or selected automatically by the processing unit.

In some examples the apparatus may comprise an X-ray detector configured to collect X-rays emitted from the electron transparent surface layer to provide an X-ray energy spectrum. In this way, high resolution X-ray spectroscopy data may be collected from the electron transparent sample layer. In particular, the apparatus may be configured to allow orientation of the sample such that: the focussed electron beam is directed at the surface region of interest on the first face of the sample; the X-ray detector is directed at the surface region of interest on the first face of the sample.

In some examples of the invention the apparatus comprises: an electron detector configured to collect scattered electrons from the electron transparent sample layer to provide an electron intensity image; an X-ray detector configured to collect X-rays emitted from the electron transparent surface layer to provide an X-ray energy spectrum; a sample holder configured to move the sample relative to the electron beam system, electron imaging detector and X-ray detector between: a first orientation in which the focussed electron beam is directed at the milled surface of the electron transparent surface layer and the electron detector is directed at the first face of the sample, opposite to the milled surface; and a second orientation in which the focussed electron beam and the X-ray detector are directed at the surface region of interest on the first face of the sample. In this way, the apparatus may be used to sequentially prepare an electron transparent sample by milling the sample while leaving the surface region of interest intact, collect TKD data with the electron detector and collect high resolution EDS data with the X-ray detector.

The apparatus may further comprise a gas injection system wherein the apparatus is configured such that the electron beam and gas injection system may be used to perform electron beam assisted deposition.

The apparatus may further comprise a memory holding computer-readable instructions, that when executed, cause the apparatus to perform the method steps defined in the appended claims or set out in the above or below defined aspects of the invention. In a further aspect of the invention there is provided computer implemented method of processing an electron image comprising a Kikuchi diffraction pattern, the method comprising: identifying a Kikuchi band in the electron image; determining the width of the identified Kikuchi band; calculating a minimum and/or maximum expected Kikuchi band width based on the lattice spacings of one or more candidate phases; disregarding the identified Kikuchi band if the determined width is below the calculated minimum expected Kikuchi band width and/or above the maximum expected Kikuchi band width.

The computer implemented method of processing an electron image comprising a Kikuchi diffraction pattern may form part of the above defined method of preparing a sample for analysis. The above defined apparatus for preparing a sample for analysis may comprise a processing unit configured to execute the computer implemented method of processing an electron image comprising a Kikuchi diffraction pattern.

By disregarding features outside of an expected range based on a list of one or more candidate phases, the method reduces erroneous identification of image features as Kikuchi bands, allowing for more accurate indexing of crystallographic orientation. The maximum and/or minimum lattice spacings of the one or more candidate phases may be stored in a memory. The candidate phases may be entered by a user in a user interface by selecting the candidate phases from a list or entering them in a user input. In other examples the candidate phases may be determined automatically, for example using spectroscopy.

The method preferably comprises calculating a minimum and maximum Kikuchi bandwidth and disregarding the identified Kikuchi band if the determined width is outside of a range defined by the minimum and maximum Kikuchi bandwidth. In this way, a detected feature is disregarded both if it is too broad or too narrow to be consistent with the expected phases of the sample. In some examples, the maximum Kikuchi bandwidth can be used to optimise the identification of the band edges. In particular, when a Kikuchi band is identified in the electron image, the maximum expected Kikuchi bandwidth (based on the minimum lattice spacing of the one or more candidate phases), may be used to determine the distance from the centre of the Kikuchi band that should be searched to find the Kikuchi band edge.

Preferably calculating a minimum and/or maximum Kikuchi band width additionally takes into account: the accelerating voltage of the electron beam and/or the position of the identified Kikuchi beam relative to the pattern centre. In particular, the determining the width of the identified Kikuchi band may comprise: measuring the distance of the identified Kikuchi band to the pattern centre; applying a correction to the determined width of the Kikuchi band to mitigate the effect of gnomonic distortion based on the measured distance. The method may alternatively comprise measuring the distance of the identified Kikuchi band to the pattern centre and applying a correction to the expected maximum and/or minimum Kikuchi bandwidth based on the one or more candidate phases. The pattern centre preferably corresponds to the closest part of the detector to the source of the Kikuchi pattern on the sample.

The method may also comprise calculating a minimum and/or maximum Kikuchi band width based on the lattice spacings of one or more candidate phases using the current accelerating voltage of the electron beam.

Identifying a Kikuchi band in the electron image may comprise: applying a Hough transform to the electron image to provide a Hough image in which the Kikuchi bands in the electron image are represented by intensity peaks; identifying an intensity peak in the Hough image as corresponding to a Kikuchi band. The Hough image may additionally be processed with a butterfly filter wherein the intensity peaks are identified in the filtered Hough image. Subsequent processing may be performed in the unfiltered image. Determining the width of the identified Kikuchi band comprises: identifying the points of steepest intensity gradients on opposing edges of the intensity peak in the Hough image as edge positions; determining the width of the Kikuchi band based on the distance between the edge positions.

Preferably identifying the steepest intensity gradients comprises: searching from the peak position away from the intensity peak to a predetermined maximum distance, wherein the predetermined maximum distance is based on the maximum lattice spacing of one or more candidate phases. In particular the method may comprise using the maximum lattice spacing of the one or more candidate phases to calculate a corresponding maximum distance in the Hough space image. The search of the Hough space image for the edge position is preferably carried out at a sub-pixel resolution within the Hough image.

The Kikuchi band centre is preferably assigned to a position midway between the Kikuchi band edge positions. The method preferably further comprises identifying a plurality of Kikuchi bands in the electron image and determining a crystallographic orientation based on the relative positions and/or orientations of the Kikuchi bands.

DESCRIPTION OF THE FIGURES

FIG. 3C illustrates a method of processing an electron image comprising a Kikuchi diffraction pattern according to the present invention;

SPECIFIC DESCRIPTION

Figure 1A:
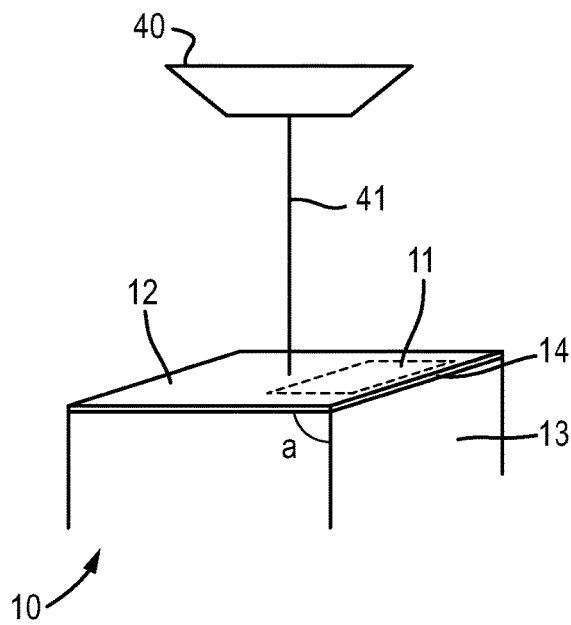
FIGS. 1A to 1C schematically illustrate a method of preparing a sample for analysis according to the present invention.
Figure 1B:
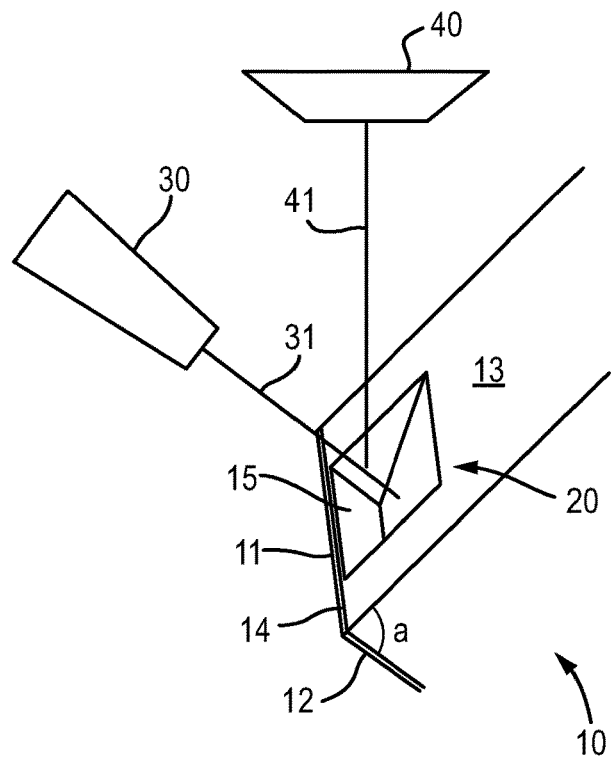
Figure 1C:
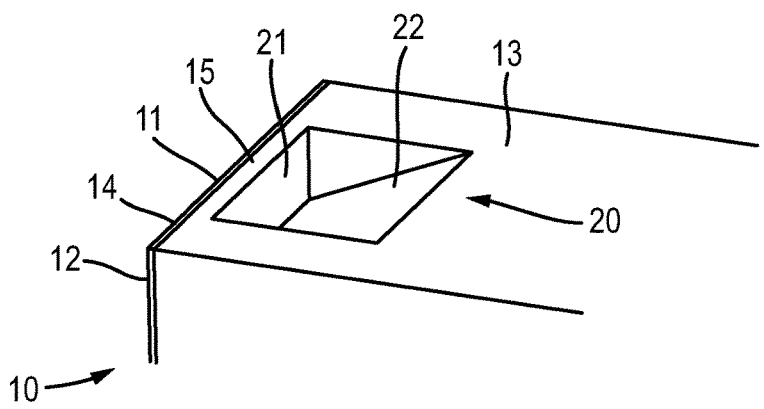

FIGS. 1A to 1C schematically illustrate a method of preparing sample 10 for analysis according to the present invention. The method involves providing a sample 10, as shown in FIG. 1A, the sample 10 having a surface region of interest 11 on a first face 12 of the sample 10 and a second face 13 oriented at an angle α to the first face 12 about a common edge 14 between the first 12 and second 13 faces. The method further involves milling the second face 13 of the sample 10, as shown in FIG. 1B, to provide a sloping trench 20 in a surface of the second face 13 adjacent to the common edge 14, wherein the trench 20 is arranged so as to provide an electron transparent sample layer 15 comprising the surface region of interest 11.

The method allows for preparing an electron transparent sample including the region of interest 11, while preserving the surface of the surface region of interest 11, since milling is only carried out on the second face 13, to approach an underside of the surface region of interest 11. In this way, the sample preparation method allows for correlative characterisation work using characterisation methods that require both an electron transparent sample layer and which also require preservation of a sample surface. Moreover, the sample preparation steps and the sample characterisation steps can be carried out in situ in the same instrument, greatly improving the speed in which data can be obtained. In contrast to prior art methods, the present method of providing a trench located wholly within the second face 13 of the sample rather than extending through the full thickness of the sample, it is possible to significantly reduce the amount of milling required to prepare the electron transparent sample layer 15 and means the technique can be applied to samples of any thickness (within the limitations defined by the practicalities of sample mounting within the sample chamber of the instrument).

As shown in FIG. 1A the sample in this example has a generally cuboid shape with the second face 13 approximately perpendicular to the first face 12 about the common edge 14. However, the sample 10 can have any shape so long as it allows milling from a second face 13 of the sample which is at an angle to the first face such that milling can be carried out from the underside of the sample region of interest 11. Any suitable location for the sample region of interest 11 can be chosen as long as it is positioned towards an intervening edge 14 between a first face 12 and second face 13, such that milling can be carried out from the second face 13 towards the underside of the region of interest 11.

As shown in FIG. 1B milling can be carried out with any suitable technique which allows for the milling of a trench on the second face 13 up to the underside of the surface region of interest 11, so as to provide an electron transparent surface layer 15 on which the surface layer of interest 11 is positioned. The trench 20 on the second face 13 of the sample 10 is preferably a sloping trench with the deepest side adjacent to the first face 12. As shown in FIG. 1C the sloping trench is preferably arranged to have a first internal side 21 which is parallel with the surface layer of interest 11 and where the base of the first side 21 defines the deepest point of the trench 20. The trench 20 is then arranged with an angled base surface 22 which slopes upwards away from the base of the first internal side 21 to meet the surface of the second face 13.

As will be illustrated below, this arrangement allows for subsequent characterisation techniques which involve directing an electron beam 41 at the first internal side 21 of the sloping trench 20, to focus the electron beam 41 on the electron transparent layer 15 from the opposite side to the surface region of interest 11. The angle of the bottom surface 22 of the sloping trench therefore determines the angle at which an electron beam 41 can be directed onto the milled first internal side 21 of the trench 20. To provide maximum flexibility in the orientation of the electron beam 41, the angled bottom surface 22 is preferably at an angle of between 30 and 85 degrees relative to the surface of interest, more preferably around 65 to 70 degrees which provides a good balance between having to mill significant amounts of material away, whilst also providing alignment of the electron beam close to perpendicular to the sample region of interest 11. As shown in FIGS. 1B and 1C the trench is preferably arranged such that the electron transparent sample layer 15 is a layer parallel with the first face 12. That is, the electron transparent surface layer 15 lies within the plane of the first face 12 of the sample 10.

The milling steps shown in FIG. 1B can be performed with any known milling beam system such as a focussed ion beam, broad ion beam or laser. As shown in FIG. 1A it is preferably performed in a dual beam instrument with a focussed ion beam system 30 and an electron beam system 40 to allow for simultaneous imaging and milling of the sample 10, as in convention FIB-SEM lift out techniques. A specific example of the method using a FIB-SEM is as follows.

Firstly a region of interest 11 to be used for preparation of the sample is identified using plan view SEM imaging, as shown in FIG. 1A, with the sample 10 oriented within the chamber of the dual beam FIB-SEM such that the electron beam 41 is approximately perpendicular to the first face 12 of the sample 10. This step may not be important in the case of a homogeneous thin film on the first face 12 of the sample 10 to be studied but this step can be used to identify more specific local regions of interest, as long as the region of interest is close enough to an edge 14 of the sample 10 to allow milling from a second side 13 of the sample up to the underside of the region of interest 11.

As shown in FIG. 1B sample 10 is then rotated to allow for FIB milling on the adjacent second face 13 of the sample. The sample 10 is preferably rotated such that the ion beam is approximately parallel to the first face 12 of the sample 10, as shown in FIG. 1B. For conventional orientations of the FIB 30 relative to the electron beam system 40 of around 50-60 degrees, this step therefore generally involves a sample tilt of around 140 to 150 degrees to ensure the FIB beam system 30 is correctly oriented relative to the region of interest 11 on the first sample face 12. Once in a correct orientation for milling as shown in FIG. 1B the FIB can be used to mill a sloping trench, as in conventional FIB sample lift out. In particular a first coarse milling step can be used to mill a trench 20 on the second face, up to within 1 to 2 micrometres of the sample edge 14. The coarse milling step can be carried out at an increased beam current to allow for material to be removed from the second sample face 13 at a faster rate. The beam current can then be reduced to carry out a fine milling step in which the sample layer including the region of interest 11 is milled from a thickness of 1 to 2 micrometres down to electron transparency. This involves milling the sample layer 15 to a thickness of less than 100 nanometres to ensure electron transparency for further characterisation.

As shown in FIG. 1C the final, prepared sample has an electron transparent sample region 15 with a thickness of less than 100 nanometres which remains supported by the surrounding bulk sample. No further milling steps are required to free the electron transparent example 15 from the bulk sample 10 to remove it to a sample grid, as in conventional FIB lift out, but rather further characterisation can be carried out with the electron transparent region 15 supported by the surrounding sample 10 as shown in FIG. 1C. Since the delicate electron transparent sample region 15 remains supported by the bulk sample 10, failure rate in preparing a sample is greatly reduced and damage to the sample from the first ion beam is reduced due to the reduced number of milling steps relative to those required to attach the sample to a micromanipulator probe, to free it from the bulk sample 10 and to attach it to a sample grid for further analysis.

At the stage of sample preparation shown in FIG. 1C the sample 10 could then be transferred to further instruments for additional characterisation. In particular, the prepared sample 10 is both electron transparent but also preserves the surface 12 of the region of interest 11 to allow for further correlative surface and structural characterisation techniques, for example electron imaging and diffraction in a different SEM, together with surface morphology analysis, which require the surface to be intact, for example AFM. It also allows for illumination of the milled surface 21 of the electron transparent sample layer with an electron beam 41 shown in FIG. 1B, allowing for techniques which are less dependent on the incident surface 21 being intact but require the exit surface to be preserved to allow for high quality data to be obtained.

In preferable examples of the invention, the sample preparation steps are carried out within an instrument which includes further hardware to allow for these steps to be carried out in situ, removing the need for sample transfer to a second instrument for characterisation. Examples of characterisation techniques which benefit from the sample preparation method of the present invention are discussed with reference to FIGS. 2 to 4.

Transmission Kikuchi Diffraction Analysis

Figure 2:
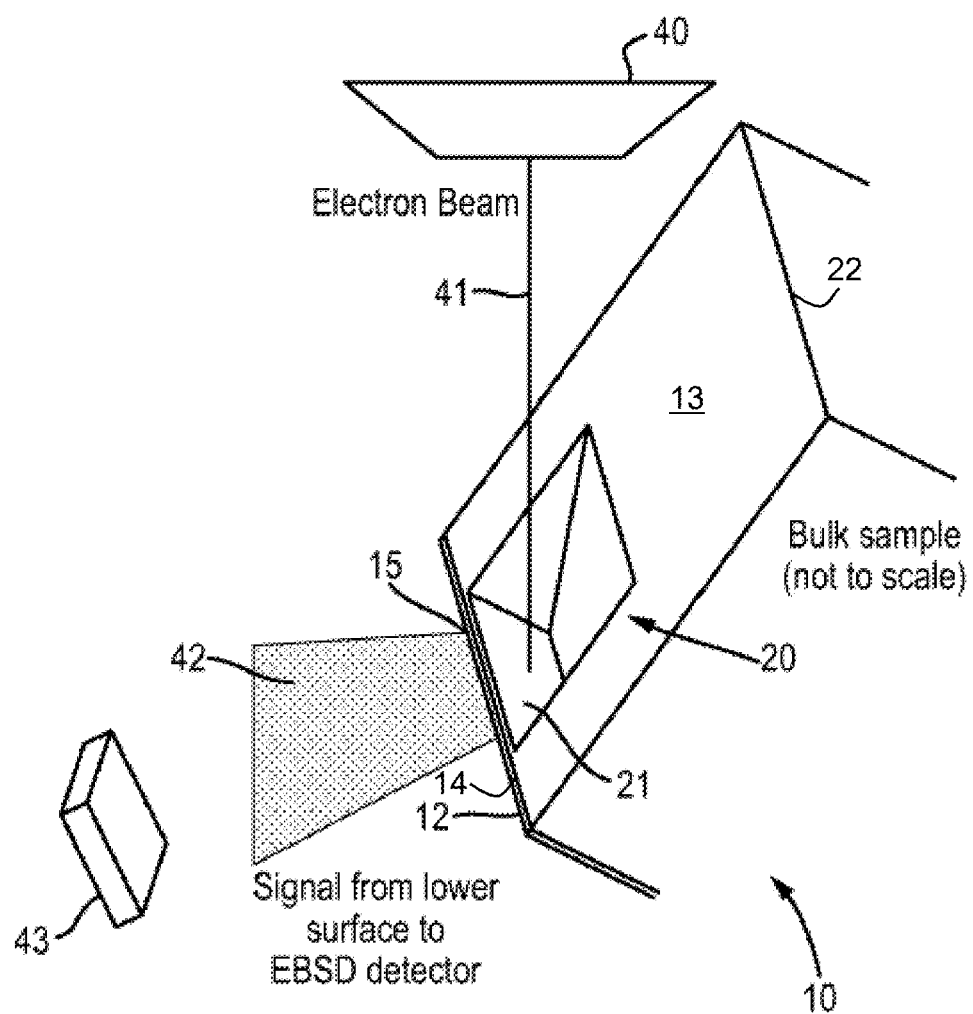
FIG. 2 illustrates a method of collecting a scattered electron intensity signal from the sample prepared according to the method of the present invention.

FIG. 2 illustrates an arrangement for obtaining transmission Kikuchi diffraction (TKD) data from a sample prepared according to the present invention. TKD is of particular interest as, when combined with the sample preparation methods of the present invention, it provides the possibility of obtaining nanoscale crystallographic information (down to less than 10 nm) from a sample within the SEM—something usually only possible within the TEM.

TKD data can be obtained with conventional electron backscatter diffraction (EBSD) hardware within the SEM. Although EBSD can provide a wealth of information about crystal structure, particularly in polycrystalline films, conventional EBSD is limited in resolution and is unsuitable for the analysis of nanocrystalline structures (with dimensions less than 100 nanometres). Usually TEM is required for the analysis of such nanocrystalline samples. However, the use of TEM requires complex and time consuming sample preparation and the transfer of the sample, after preparation, into the TEM.

TKD utilises the same hardware and software as EBSD to collect intensity images of electrons scattered through electron transparent samples. TKD allows for analysis of thin film structures which are nanocrystalline with film thicknesses in the 5 to 100 nanometre range, not possible with conventional EBSD. Since TKD is sensitive only to the crystallinity of the exit surface, the sample preparation technique according to the present invention is ideally suited, since it allows for complete preservation of a surface region of interest 11. By orientating the sample 10 as shown in FIG. 2, with the milled underside 21 of the sample region of interest 15 oriented towards the electron beam 41, transmitted and scattered electrons 42 are collected from the preserved surface region of interest.

The combination of the present sample preparation method and TKD characterisation therefore provides an advantage over TEM Whereas TEM imaging and diffraction is a projection of the full sample thickness and therefore places a much higher demand on the quality of both the entrance and exit surface of the sample, for TKD the entrance surface is not critical and can even be a different material. For this reason the milling process can be much faster compared to TEM sample preparation in which much more care must be taken during sample preparation, requiring low current/low energy ion polishing to ensure the crystallinity of both the entrance and exit surfaces.

FIG. 2 shows the orientation of the sample 10 with an instrument including the hardware for TKD analysis. In particular the apparatus includes an EBSD detector 43, i.e. an electron intensity imaging detector, such as a CCD, CMOS or direct electron detection camera. As shown in FIG. 2, the sample 10 is oriented relative to the electron beam system 40 such that the focused electron beam 41 is directed through the electron transparent surface layer 15 and the scattered electrons 42 emerging from the first surface 12 of the sample 10 are collected with the electron imaging detector 43.

Since the electron beam 41 is directed at the milled underside 21 of the electron transparent surface layer, any reduction in crystallinity due to ion implantation will not affect the quality of the data obtained given that TKD requires only the exit surface to remain intact. The angle of illumination with the focussed electron beam 41 is limited by the geometry of the trench 20, with a shallower sloping trench allowing an illumination angle closer to perpendicular to the electron transparent sample 15 but requiring a greater amount of milling and more material to be removed. Generally a suitable compromise allowing a strong signal to be collected at a detector 43 whilst not requiring excessive milling is to provide a sloping trench with an angled base surface at an angle of 65 to 75 degrees relative to the first surface 12 of sample 10. This allows a corresponding angle of the focussed electron beam of 65 to 75 degrees relative to the plane of the electron transparent sample 15. As shown, the scattered electrons 42 are collected with the imaging detector 43 to collect a transmission Kikuchi diffraction (TKD) pattern, as shown in FIG. 3A.

Figure 3A:
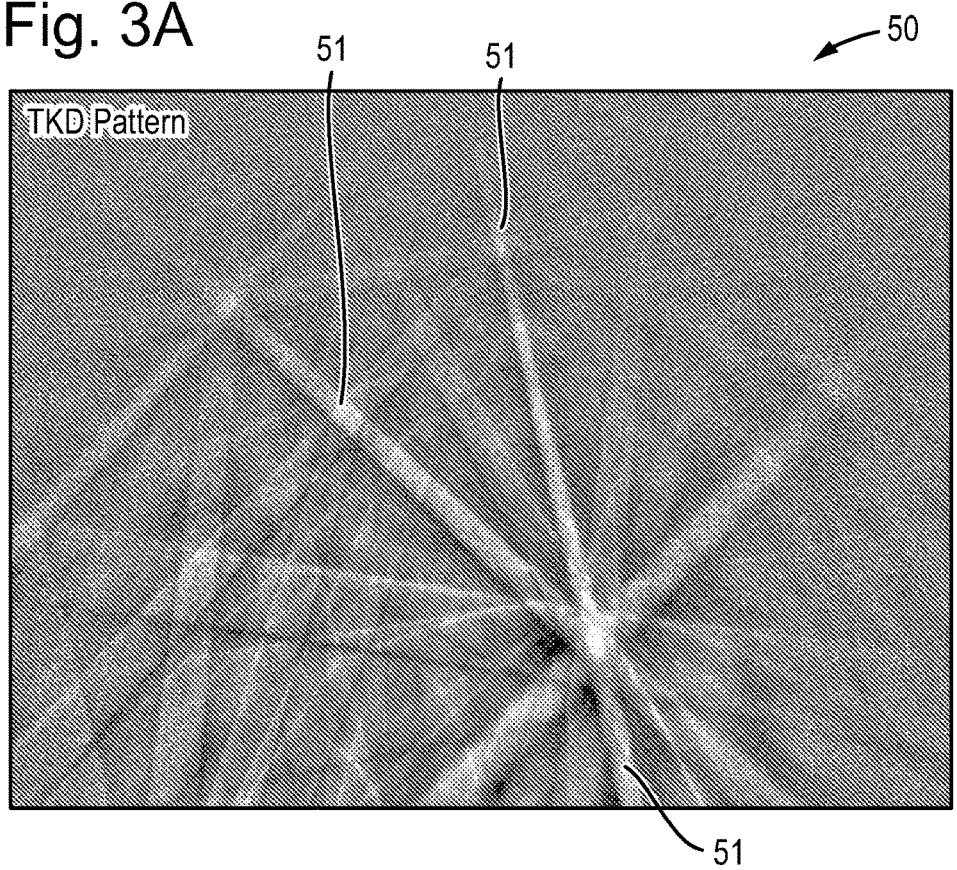
FIG. 3A illustrates a transmission Kikuchi diffraction image collected from a sample prepared according to the present invention.
Figure 3B:
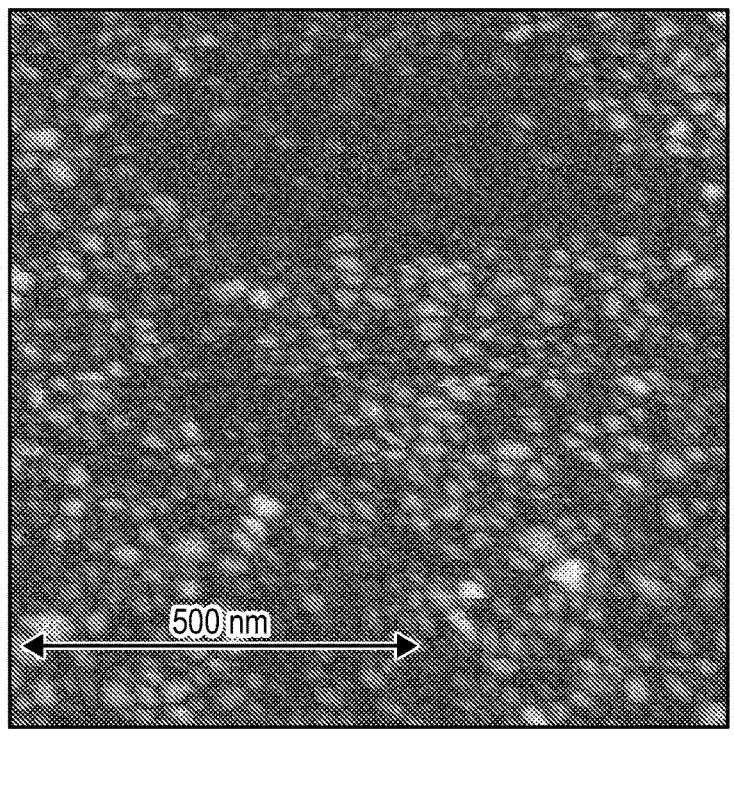
FIG. 3B illustrates a diffraction pattern quality map obtained by scanning the electron beam across the sample to collect transmission Kikuchi diffraction data from an area of the sample.

At each incident point of the electron beam from the milled surface 21 of the sample 15 a TKD pattern 50, as shown in FIG. 3A, may be collected. The TKD pattern includes a number of Kikuchi bands 51 which indicate the orientation and provide crystallographic information on the region of the sample illuminated by the electron beam 41. By scanning the electron beam 41 across the surface of the electron transparent sample layer 15, shown in FIG. 2, a map of the orientation of the grains forming the polycrystalline film can be formed as shown in FIG. 3B. As explained above imaging of crystal grains at this resolution is generally only possible within the TEM but the present sample preparation technique allows for preparation of the sample and characterisation to be carried out within the same FIB SEM instrument.

Processing TKD Data

The apparatus preferably further comprises software for processing the TKD data collected from the TKD analysis process illustrated in FIG. 2. The apparatus may further include a processing unit including software for implementing a number of computer implemented method steps. In particular the software may be configured to implement method steps to provide detection of Kikuchi bands 51 in order to determine the orientation of a crystal grain on which the beam is incident. The software may further include features which provide increased accuracy in identifying Kikuchi bands over known automated techniques. This process, referred to as "primary band detection (PBD)" or "TKD-optimised band detection" is implemented within the software as follows.

Once one or more electron intensity images of the TKD pattern 50 have been obtained using the procedure illustrated in FIG. 2, the TKD patterns 50 are first processed using a Hough transform, as is known from existing Kikuchi diffraction pattern processing techniques. The Kikuchi bands in the original TKD pattern correspond to peaks 53, as shown in the Hough image of FIG. 3C. As shown in the enlarged portion of FIG. 3C, around one of the Hough image peaks 53, the peak maxima are identified and two minima, p-min 1 and p-min 2, are identified either side of the peak 53. Between the two minima, the steepest intensity gradients are identified as the edges, p-edge 1 and p-edge 2, corresponding to the edges of the original Kikuchi band 51. The spacing between two edges p-edge 1, p-edge 2 defines the bandwidth of the original Kikuchi band 51. The midpoint between the edges is determined as the centre of the Kikuchi band. By identifying the positions of the Kikuchi bands in the images in this way, a Kikuchi pattern 50 can be indexed to determine the crystallographic orientation. By scanning the beam across the sample surface an orientation map 56 can be formed as shown in FIG. 3B, providing nanoscale crystallographic information.

A problem can arise in this method in that features in the image can be erroneously identified as Kikuchi bands. This can prevent accurate indexing of the orientations. The present method can implement a number of further steps to further optimise the automated identification of Kikuchi bands 51 to address these issues.

Firstly, the algorithm can allow for selection of one or more expected phases (i.e. materials and corresponding crystallographic structures) present in the sample. These can be identified automatically, for example via spectroscopic analysis within the apparatus, or can be entered by a user. The algorithm can use the maximum and minimum lattice spacing of the phases in the expected phase list to determine a maximum and minimum bandwidth for the Kikuchi bands 51 in the pattern, which allows the software to automatically discard features identified as Kikuchi bands if they are not consistent with the expected crystallographic phases. The maximum lattice spacing present in the sample determines the minimum width of a Kikuchi band 51 present in the TKD pattern and similarly the minimum lattice spacing present in the materials of the sample determines the maximum width of a Kikuchi band expected in the Kikuchi diffraction pattern 50.

The software may also take account of a number of other parameters to more accurately identify the Kikuchi bands 51. In particular, the algorithm takes account of the position of the Kikuchi band 51 of interest relative to the pattern centre, i.e. the closest part of the detector 43 to the sample 15. The relative position of the Kikuchi bands to the pattern centre results in gnomonic distortion of the Kikuchi diffraction pattern 50. Taking account of the distance of the Kikuchi band 51 being measured relative to the pattern centre allows for the algorithm to automatically mitigate the effect of gnomonic distortion on the shape of the diffraction pattern 50. The algorithm can further be structured to take into account the accelerating voltage of the electron beam 41 used to form the pattern 50. Since a higher accelerating voltage reduces the electron wavelength this also reduces the width of the Kikuchi bands 51 in the diffraction pattern 50.

Figure 4A:
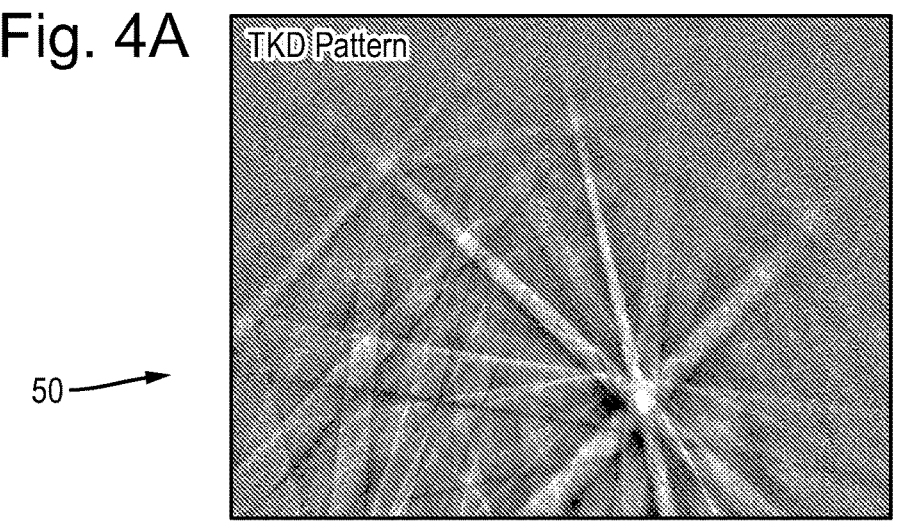
FIGS. 4A to 4C illustrate a method of processing an electron image comprising a Kikuchi diffraction pattern according to the present invention.
Figure 4B:
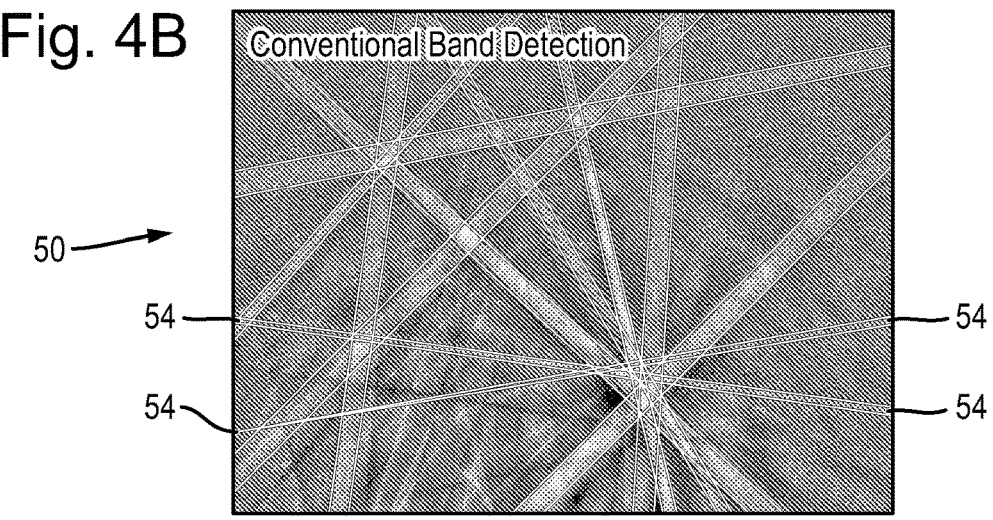
Figure 4C:
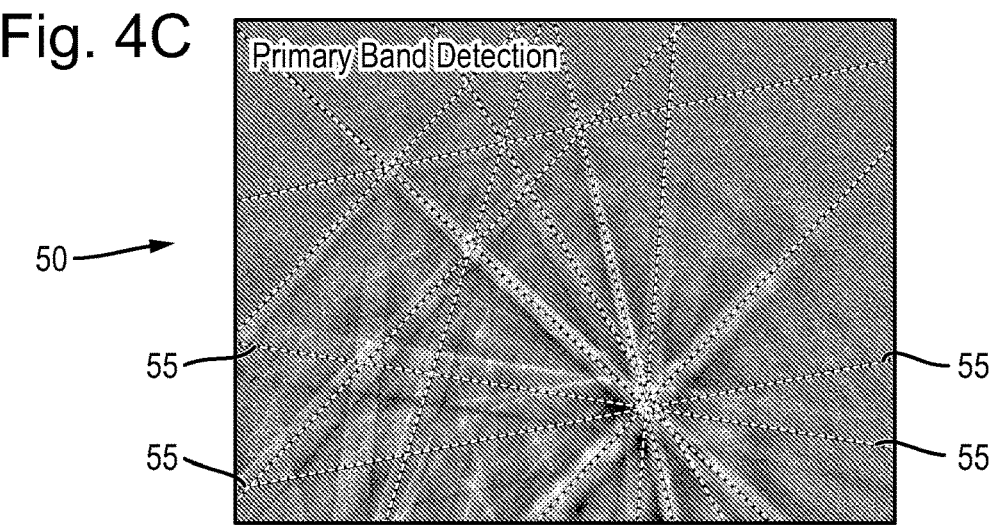

By calculating a minimum predicted bandwidth for a particular Kikuchi band 51 taking into account the maximum lattice spacing of phases in an expected phase list, the position of the Kikuchi band 51 relative to the pattern centre, and the accelerating voltage of the electron beam, a lower limit for the Kikuchi bandwidth can be accurately predicted. This reduces erroneous identification of narrow features in the electron image 50 as Kikuchi bands, which would reduce the accuracy of orientation measurements. This method of optimising Kikuchi band detection is illustrated in FIGS. 4A to 4C.

As described above, a TKD pattern 50 is obtained from the sample and detector orientation illustrated in FIG. 2. Conventional Kikuchi band detection methods often incorrectly identify contrast variations at the edge of broad Kikuchi bands as individual Kikuchi bands themselves. As shown in FIG. 4B, a conventional Kikuchi band detection method detects narrow contrast variation 54 as Kikuchi bands. Therefore, when indexing the TKD pattern these contrast variations are erroneously taken into account and prevent the precise determination of the crystallographic orientation. Using the above primary band detection method which predicts the minimum width of a Kikuchi band 51, the narrow contrast variations 54 shown in FIG. 4B are disregarded based on the calculated minimum predicted width. In this way the broad Kikuchi bands are correctly identified along the centre of these Kikuchi bands 55 as shown in FIG. 4C.

These method steps for identifying Kikuchi bands within a collected TKD pattern significantly improve the precision of band detection and subsequent crystallographic orientation measurements. These method steps have the greatest impact when working in the typical TKD geometry illustrated in FIG. 2, in which the TKD pattern centre may be positioned above the top edge of the diffraction pattern. Therefore the above described method steps, which may be implemented in software running on a computer as part of the apparatus, combine synergistically with the above described sample preparation and analysis steps of FIG. 2 to allow for high quality nanoscale structural information to be obtained from a specimen within an SEM. Although the software steps may be applied to data obtained from conventionally prepared specimens they provide further increased advantages when applied with the method steps of the present invention described above.

The software may also incorporate knowledge of the minimum lattice spacing (and therefore maximum Kikuchi bandwidth). In particular, knowledge of the minimum lattice spacing from the expected phase list, together with the position of the Kikuchi band 51 relative to the pattern centre and the energy (accelerating voltage) of the electron beam can be used to predict a maximum Kikuchi bandwidth and therefore determine a position to begin the search for the band edge, as shown in the enlarged portion of FIG. 3C.

Knowledge of the minimum lattice spacing allows the system to know how far away from the initially detected band centre to search within the Hough space image for the band edges, as well as providing an upper limit for the detected bandwidths. This allows a higher precision search for the band edges p-edge 1 and p-edge 2 to be carried out around the peak 53, for example at subpixel resolution, within the Hough image, to more precisely identify the band edges and as such the band centre, assigned as midway between the two refined band edge positions.

The combination of sample preparation method, allowing for a surface region to be preserved on the surface region of interest 11, followed by simple re-orientating of the sample into the geometry shown in FIG. 2 to collect the image, together with the above described method steps for the analysis of the obtained TKD patterns allows for much higher resolution structural data to be obtained from specimens within an SEM than previously possible, using known methods.

X-Ray Spectroscopy Characterisation

Figure 5:
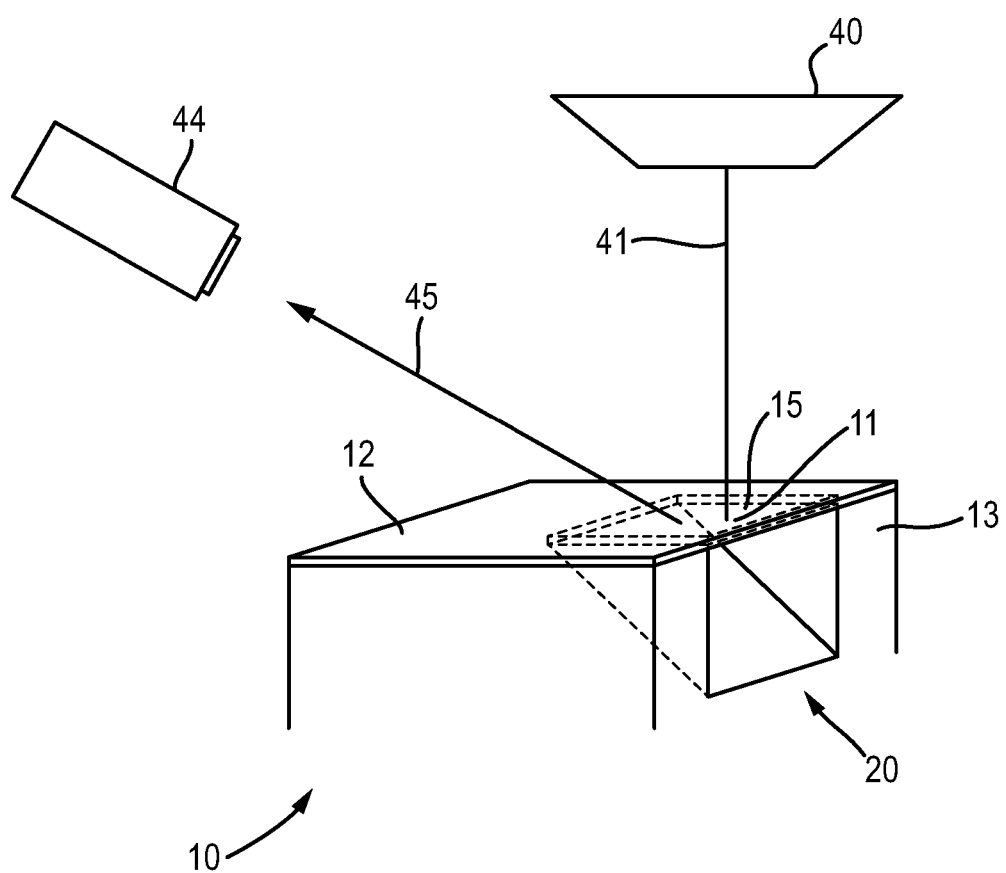
FIG. 5 illustrates a method of collecting a high resolution EDS signal from the sample prepared according to the method of the present invention.

The sample preparation method according to the present invention also allows for further characterisation techniques to be performed on the sample 10. FIG. 5 illustrates the geometry for high resolution x-ray spectroscopy to be carried out on the electron transparent sample 15, after the preparation of the sample using the method described above. Although energy dispersive x-ray spectroscopy (EDS) can be performed on the region of interest 11 on the first face of the sample 12 prior to the milling steps of the present method. The resolution of the data is limited, particularly due to the interaction volume of the electron beam 41 with the sample 10 resulting in x-rays 45 being generated from a relatively large volume of the sample. The resolution of the data is therefore limited in conventional EDS of the sample surface and it cannot be used to collect high resolution data of polycrystalline thin films where the dimensions of specific crystals may be below 100 nanometres, unless the electron beam energy (accelerating voltage) is significantly lowered. By orienting the sample relative to an electron beam system 40 and x-ray detector 44 as shown in FIG. 5, high resolution EDS data may be collected from the electron transparent thin film without having to lift out or transfer to a TEM. Instead, once the milling steps have been performed, as shown in FIG. 1B, the sample may be tilted back to the orientation shown in FIG. 5 with the electron beam 41 normal to the first face 12 of the sample 10 including the region of interest 11.

Due to the sample geometry the focussed electron beam 41 can be focussed on a small spot size to fluoresce x-rays 45 from a very small area of the electron transparent sample 15 in order to provide high resolution x-ray data. By positioning the x-ray detector 44 facing the first surface 12 of the sample as shown in FIG. 3 the x-ray detector 44 only collects x-rays from the electron transparent sample layer 15 and not from any x-rays produced via the transmission of the electron beam through the electron transparent surface layer and onto the bulk sample 10 below. Therefore, having both the electron beam 41 and detector 44 facing the first face 12 of the sample and the surface layer of interest 11 high resolution x-ray data can be obtained. Beam voltages of up to 30 kV are available in SEMs and this type of high resolution EDS analysis may be carried out within the same SEM used to prepare the sample, removing the need to transfer to a TEM which is usually required for this type of analysis. As in conventional techniques by scanning the focussed electron beam 41 over the surface of the electron transparent sample layer 15 an x-ray spectroscopic image may be obtained, allowing for correlative analysis with the TKD data obtained from the orientation shown in FIG. 2 and any further data obtained from a sample surface before milling is carried out as shown in FIG. 1A.

Multi-Step Sample Preparation and Analysis Sequence

As described above, one of the major advantages of the sample preparation and analysis techniques according to the present invention is the ability to prepare the sample and then carry out multiple characterisation techniques all within the same apparatus, for example a FIB-SEM with appropriate hardware for detecting the relevant signals. FIGS. 6A to 6E illustrates several exemplary steps in a process of characterising a sample which can all be carried out within the same apparatus. The apparatus for preparing and analysing the sample comprises the milling beam system 40, suitable to mill the second face of the sample 13 to provide the trench adjacent to the first face 12 to allow for the electron transparent sample layer 15 to be prepared. The apparatus further includes an electron beam system 40 for imaging and characterisation and one or more detectors 43, 44 for collecting the various signals. In the specific example of FIG. 6 the apparatus includes a FIB system 30 for generating a focussed ion beam for milling the sample as shown in FIG. 6C, an electron imaging detector (i.e. an EBSD detector) 43 for collecting scattered electrons and an x-ray detector 44 for collecting x-rays fluoresced from the sample. FIGS. 6A to 6E illustrate various steps in the characterisation process, all of which may be obtained simply by correctly orientating the sample 10 relative to the electron beam system 40, milling beam system 30, and detectors 43, 44.

Figure 6A:
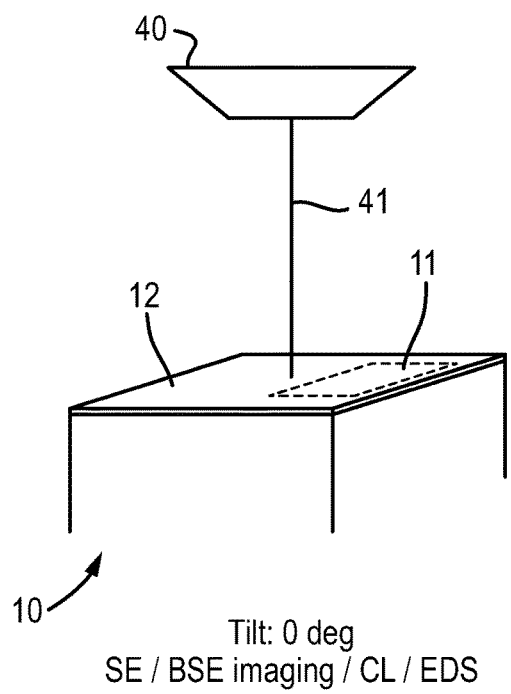
FIGS. 6A to 6E illustrated a sequence of sample preparation and analysis steps of a method according to the present invention.
Figure 6B:
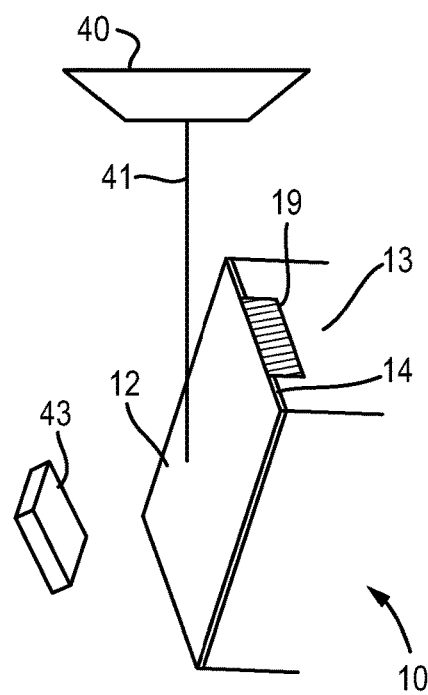
Figure 6C:
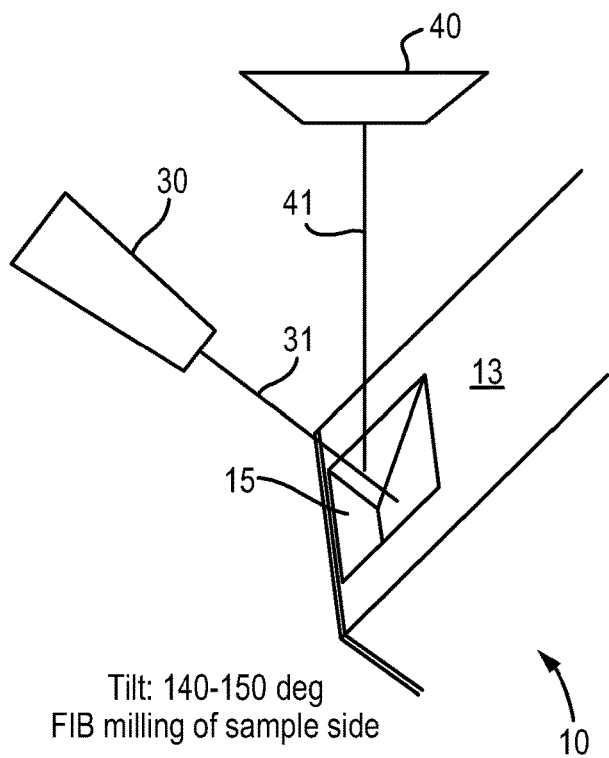
Figure 6D:
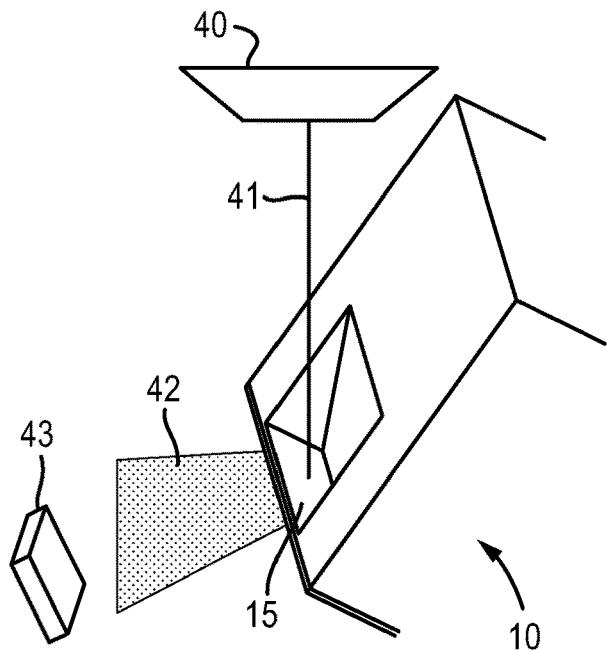

Firstly as shown in FIG. 6A data may be collected from the surface region of interest 11 on the first face 12 of the sample 10 prior to the milling steps. For example, the sample can be oriented with the first face 12 perpendicular to the electron beam 41 to allow for various characterisation techniques to be carried out on the sample surface, including secondary electron and backscatter electron imaging, cathode luminescence and EDS. The sample then may be tilted relative to the electron beam for conventional EBSD as shown in FIG. 6B. In particular the first face of the sample may be tilted through around 70 degrees to provide the optimum geometry for conventional EBSD, with the resulting scattered electron signal collected with the EBSD detector 43.

FIG. 6B also illustrates an optional additional step which may be included in the method, prior to performing the milling steps. In particular, the apparatus may further comprise a gas injection system and the method may include depositing a protective layer 19 using the gas injection system and electron beam using electron beam assisted deposition. The protective layer 19 can serve to protect the first face 12 of the sample from unintended ion beam damage during milling and also can improve the uniformity of the milled surface of the electron transparent sample layer 15. The protective layer can be deposited so as to extend over a portion of the second face 13 of the sample adjacent the common edge 14 and preferably extend over the common edge 14. Although the protective layer 19 is not shown in the subsequent FIGS. 6C to 6E, clearly where this optional step is included a portion of the protective layer would remain on the edge of the electron transparent region 15.

Figure 6E:
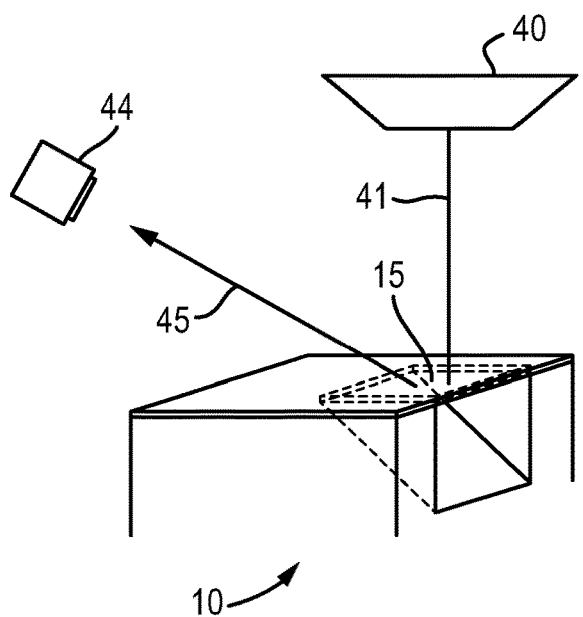

After these conventional imaging and characterisation techniques of the sample surface have been carried out, the sample preparation steps described above with reference to FIG. 1 may be carried out as shown in FIG. 6C. In particular the sample 10 may be tilted to 140 to 150 degrees relative to the plan view orientation of FIG. 6A such that the focussed ion beam 31 is approximately parallel with the first face 12 of the sample 10. The milling steps can proceed as described above to prepare the trench and electron transparent sample layer including the surface region of interest 11 on the first face 12 of the sample 10. The sample may then be tilted to approximately 150 to 160 degrees relative to the plan view orientation of FIG. 6A to allow for the focussed electron beam to be directed at the milled surface of the electron transparent sample layer 15 with the electrons scattered through the sample layer 15 collected with the electron imaging detector 43 in order to carry out TKD analysis of the thinned region 15. Finally, the sample may be returned to the plan view orientation as shown in FIG. 6E such that a high resolution EDS may be carried out by scanning the focussed electron beam over the electron transparent sample region 15 in order to collect high resolution EDS data as explained with reference to FIG. 5.

In order to provide each of the required orientations shown in FIG. 6, the apparatus preferably includes a sample holder allowing the sample to be tilted between each of the orientations of FIG. 6A to 6E, i.e. allowing tilt of 0 to 160 degrees.

The method and apparatus according to the present invention may include one or more further features.

Figure 7:
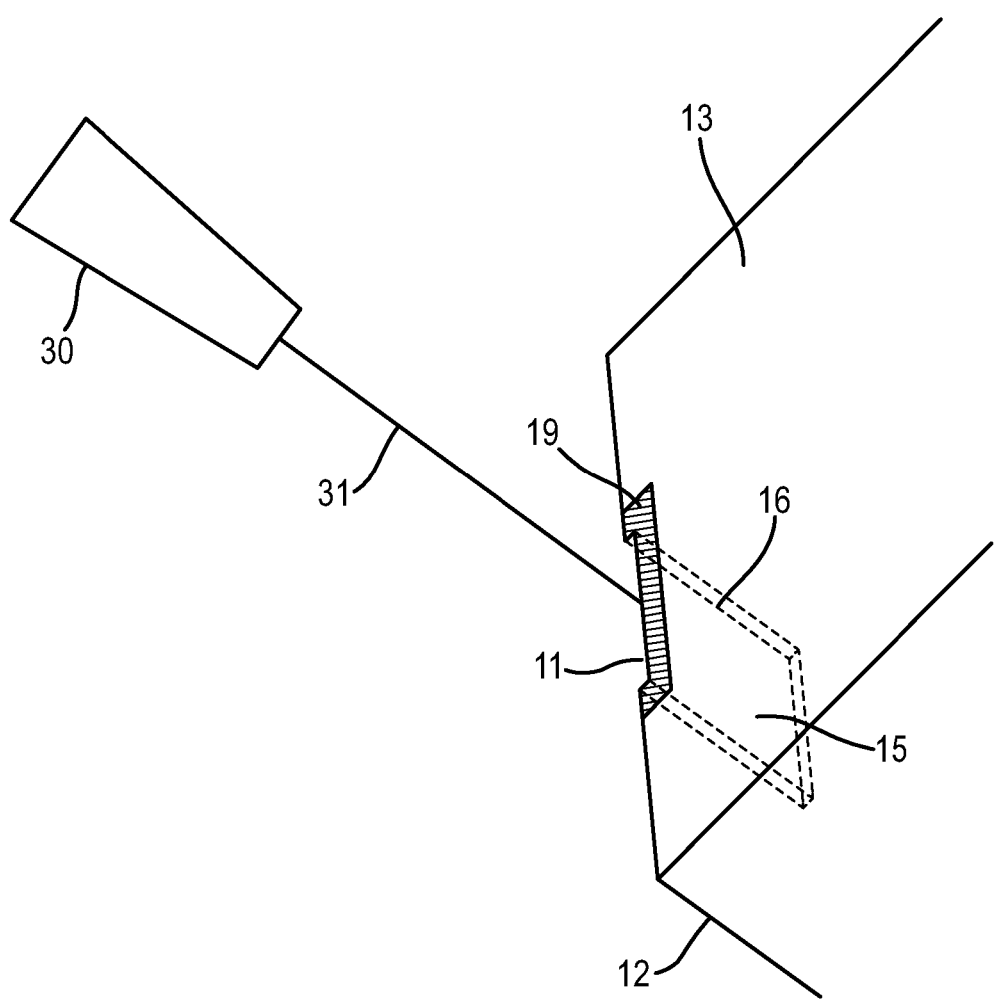
FIG. 7 illustrates an optional additional sample preparation step according to an embodiment of the present invention.

FIG. 7 illustrates an optional additional method step that may be used in certain examples of the present invention. This step involves milling a region on the first face 12 of the sample 10 with the milling beam system 30 to prepare the surface region of interest for one or more of the subsequent analysis steps described above. In particular, the method may include the step of milling the first face 12 of the sample 10 with the milling beam system 30 to provide a trench 16 in the first face 12 and thereby provide a flat, polished surface within the surface region of interest 11. This provides a more uniform sample region for analysis, particularly where the surface region of interest is not well prepared or retains some topography from initial sample polishing. It also minimises problems associated with rounding of the sample edge.

Another important advantage is that it facilitates preparation of a final sample of uniform thickness. In particular, since the milling beam angle for this initial milling of the trench 16 on the first face 12 is known, the milling beam angle for the subsequent milling of the sloping trench 20 and thinning of the electron transparent sample layer 15 can be selected more precisely to provide uniform thickness. By selecting the same milling beam tilt angle for initial milling of the trench 16 in the first face of the sample and subsequent thinning of the electron transparent region 15 within the sloping trench 20, the faces of the electron transparent sample layer 15 will be parallel. This provides a high quality sample for subsequent analysis (such as TKD), providing improved results.

This top surface milling step of FIG. 7 preferably takes place prior to milling of the sloping trench 20 in the second face 13 of the sample 10. With reference to FIG. 1, this step would therefore take place prior to the milling step of FIG. 1B, to polish the first face of the sample 12, preparing the sample region of interest 11 prior to milling the sloping trench 20. Preferably, when this preliminary preparation step is used, a protective layer 19 (typically Pt) is first deposited on the second face of the sample to ensure a better quality milled surface on the first face of the sample 12.

A preferable sequence of sample preparation steps is therefore as follows. Firstly, electron beam assisted deposition is used to deposit a protective layer on the second face 13 of the sample 10, as described with reference to FIG. 6B. Then, a trench 16 is milled in the first face of the sample using the FIB 30 to provide a flat, polished surface at the surface region of interest 11. The method then proceeds as described with reference to FIGS. 1B and 6C, by milling the sloping trench 20, where the milling beam tilt angle from the previous step may be used to select the milling beam tilt angle for the sloping trench 20 to ensure a uniform thickness of the electron transparent region 15.

The optional step of FIG. 7 would not be necessary when the method of the present invention is used to prepare a sample comprising a deposited thin film on the first face 12 (unless it was desirable to reveal an underlying layer), or where the first face 12 of the sample 10 is already perfectly polished but is beneficial in preparing a high quality electron transparent region 15 for subsequent analysis in other cases.

In some examples of the method one or more method steps are configured to be carried out automatically by the apparatus. In particular the apparatus may comprise software configured to implement an automated routine to perform the sample preparation and/or characterisation steps described above.

Although in the above described preferable examples, the analysis steps are carried out within the same instrument, it will be appreciated that some of steps could be implemented in different instruments. For example, the sampled preparation and milling steps could be carried out in a FIB SEM, before transferring the sample to a different SEM for further characterisation.

The invention claimed is:

1. A method of preparing a sample for analysis, the method comprising: providing a sample comprising a surface region of interest on a first face of the sample and a second face oriented at an angle to the first face about a common edge between the first and second faces, the second face extending between the common edge and a second edge on the opposing side of the second face of the sample; and
milling the second face of the sample to provide a trench in the surface of the second face, the trench extending from a first position on the second face between the common edge and the second edge to a second position adjacent to the common edge; wherein the trench is arranged so as to provide an electron transparent sample layer comprising the surface region of interest.

2. The method of claim 1 wherein the trench in the second surface comprises a sloping trench with a deepest side adjacent to the common edge between the first and second faces.

3. The method of claim 2 wherein the sloping trench comprises:
a first internal side parallel with the surface layer of interest, the base of the first internal side defining the deepest point of the trench; and
an angled bottom surface sloping upwards away from the base of the first internal side to meet the surface of the second face.

4. The method of claim 2 further comprising:
milling the first face of the sample to prepare a polished surface on the surface region of interest prior to milling the sloping trench in the second face of the sample.

5. The method of claim 1 wherein the trench is arranged such that the electron transparent sample layer is parallel to the first face of the sample.

6. The method of claim 1 wherein milling the second face of the sample is carried out with a milling beam system and the method further comprises orienting the sample such that the milling beam is parallel with surface layer of interest.

7. The method of claim 1 wherein the milling is performed using one or more of:
a focussed ion beam; and
a broad ion beam.

8. The method of claim 1 further comprising:
directing a focussed electron beam through the electron transparent sample layer;
collecting a signal generated by the interaction of the focussed electron beam with the electron transparent sample layer with a detector.

9. The method of claim 8 wherein the step of collecting a signal comprises:
collecting scattered electrons from the electron transparent sample layer with an electron detector.

10. The method of claim 8 comprising orienting the sample to:
direct the focussed electron beam at the milled surface of the electron transparent sample layer; and
direct the electron detector at the first face of the sample, opposite to the milled surface.

11. The method of claim 8 wherein collecting a signal comprises:
collecting X-rays generated in the electron transparent sample layer with an X-ray detector.

12. The method of claim 11 comprising orienting the sample to:
direct the focussed electron beam at the surface region of interest on the first face of the sample:
direct the X-ray detector at the surface region of interest on the first face of the sample.

13. The method of claim 1 wherein the first face of the sample comprises a polycrystalline surface layer.

14. The method of claim 13 wherein the polycrystalline surface layer comprises a thickness of less than 100 nm and/or comprises nanocrystalline structures with dimensions less than 100 nm.

15. The method of claim 1 further comprising:
preparing the first face of the sample prior to milling to produce a deformation free surface.

16. The method of claim 1 further comprising:
analysing the surface region of interest on the first face of the sample using a surface characterisation technique.

17. An apparatus for preparing a sample for analysis, the sample comprising a surface region of interest on a first face of the sample and a second face oriented at an angle to the first face about a common edge between the first and second faces, the second face extending between the common edge and a second edge on the opposing side of the second face of the sample, the apparatus comprising:

a milling beam system arranged to mill the second face of the sample to provide a trench in the surface of the second face, the trench extending from a first position on the second face between the common edge and the second edge to a second position adjacent to the common edge; wherein the trench is arranged so as to provide an electron transparent sample layer comprising the surface region of interest;
an electron beam system arranged to direct a focussed electron beam through the electron transparent sample layer; and
a detector arranged to collect a signal generated by the interaction of the focussed electron beam with the electron transparent sample layer.

18. The apparatus of claim 17 comprising an electron detector configured to collect scattered electrons from the electron transparent sample layer to provide an electron intensity image.

19. The apparatus of claim 18 configured to allow orientation of the sample such that:
the focussed electron beam is directed at the milled surface of the electron transparent surface layer; and
the electron detector is directed at the first face of the sample, opposite to the milled surface.

20. The apparatus of claim 17 comprising an X-ray detector configured to collect X-rays emitted from the electron transparent surface layer to provide an X-ray energy spectrum.

21. The apparatus of claim 20 configured to allow orientation of the sample such that:
the focussed electron beam is directed at the surface region of interest on the first face of the sample;
the X-ray detector is directed at the surface region of interest on the first face of the sample.

22. The apparatus of claim 17 comprising:
an electron detector configured to collect scattered electrons from the electron transparent sample layer to provide an electron intensity image;
a sample holder configured to move the sample between:
a first orientation in which the focussed electron beam is directed at the milled surface of the electron transparent surface layer and the electron detector is directed at the first face of the sample, opposite to the milled surface; and a second orientation in which the focussed electron beam is directed at the surface region of interest on the first face of the sample.

* * * * *